United States Patent [19]

Flaherty et al.

[11] 4,434,815

[45] Mar. 6, 1984

[54] PIPEWORK

[75] Inventors: Thomas Flaherty, Altrincham; Richard H. Price, Sale, both of England

[73] Assignee: John Kennedy (Civil Engineering) Limited, Manchester, England

[21] Appl. No.: 370,750

[22] Filed: Apr. 22, 1982

[30] Foreign Application Priority Data

Apr. 23, 1981 [GB] United Kingdom ............... 8112547
Jul. 1, 1981 [GB] United Kingdom ............... 8120319

[51] Int. Cl.³ .................................................. F16L 55/18
[52] U.S. Cl. ........................................ 138/97; 138/98; 15/104.09; 15/104.12; 166/55; 408/80; 408/83; 408/130
[58] Field of Search .............. 408/79, 80, 83, 130; 409/143; 15/104.09, 104.12; 138/97, 98, 93; 137/318; 166/55

[56] References Cited

U.S. PATENT DOCUMENTS

| 1,941,222 | 12/1933 | Pew et al. ............... 15/104.09 |
| 2,742,259 | 4/1956 | Boucher ................. 15/104.12 |
| 3,587,194 | 6/1971 | Brown ................... 15/104.12 |
| 3,618,639 | 11/1971 | Daley ......................... 138/97 |
| 3,740,785 | 6/1973 | Latall .................... 15/104.12 |
| 3,762,446 | 10/1973 | Tungseth et al. .......... 138/97 |
| 3,835,889 | 9/1974 | Hyde .......................... 138/93 |
| 3,841,355 | 10/1974 | Laner ......................... 138/89 |
| 3,899,265 | 8/1975 | Lang ......................... 408/130 |
| 3,950,461 | 4/1976 | Levens ....................... 138/97 |
| 4,197,908 | 4/1980 | Davis ........................ 409/143 |
| 4,245,970 | 1/1981 | St. Onge ..................... 138/93 |

FOREIGN PATENT DOCUMENTS

| 1155 | 3/1979 | European Pat. Off. . |
| 606377 | 7/1960 | Italy ....................... 15/104.09 |
| 17279 | of 1892 | United Kingdom ........... 138/93 |
| 1050622 | 8/1963 | United Kingdom . |
| 1116784 | 7/1966 | United Kingdom . |
| 1205515 | 6/1968 | United Kingdom . |
| 1243613 | 7/1970 | United Kingdom . |
| 1336246 | 4/1971 | United Kingdom . |
| 1261952 | 2/1972 | United Kingdom . |
| 1284059 | 8/1972 | United Kingdom . |
| 1467397 | 3/1974 | United Kingdom . |
| 1471972 | 8/1974 | United Kingdom . |
| 1501971 | 1/1975 | United Kingdom . |
| 1516307 | 9/1975 | United Kingdom . |
| 1508261 | 3/1976 | United Kingdom . |
| 1565049 | 12/1976 | United Kingdom . |
| 1566912 | 2/1977 | United Kingdom . |
| 1534780 | 5/1977 | United Kingdom . |
| 2030261 | 9/1978 | United Kingdom . |
| 2034431 | 6/1980 | United Kingdom . |
| 519522 | 7/1976 | U.S.S.R. ................... 15/104.12 |

*Primary Examiner*—John W. Shepperd
*Attorney, Agent, or Firm*—Pravel, Gambrell, Hewitt, Kirk & Kimball

[57] ABSTRACT

Apparatus is described for insertion into a branch pipe to cut an aperture in a liner provided within the main pipe for repairing the latter. The apparatus has a body together with a cutting device and a clamping member (e.g. an inflatable sleeve) both supported by the body. Means are provided for actuating the clamping member so that it presses against the inside of the branch pipe and jams the body in a fixed position within the branch pipe. The cutting device may be advanced relative to the body, to cut an aperture in the liner. Also described is an inflatable plug which may be used to provide a seal so that a grouting operation may be performed without grout being able to escape into the branch pipe or into the interior of the liner.

6 Claims, 4 Drawing Figures

PIPEWORK

This invention is concerned with pipework, for example the re-lining of sewers.

It is well known for main sewers to be repaired by introducing a tubular liner of heavy duty synthetic plastics material, e.g. polyethylene. A problem arises at the junction with a branch sewer where the liner needs to be perforated to re-establish the connection between the main sewer and the branch sewer. Normally this task is accomplished by excavating the ground to the locus of the junction, breaking through the sewer brickwork, making the perforation in the liner, re-building the sewer and back-filling. This laborious operation has to be repeated at each junction and accounts for a substantial proportion of the cost involved in the re-lining of sewers.

U.K. patent specification No. 1,261,952 by Bremner purports to overcome this problem by inserting a boring tool through the lateral connection into engagement with the outer surface of the liner. The Bremner specification states that in principle a rotating cutter of the trepan type could be used but goes on to say that such tools are inclined to be unsatisfactory when the lateral connections have awkward bends. Accordingly, Bremner proposes to fuse through the liner with a heated element. The use of a heated element in place of a cutting tool has disadvantages if the liner material is not readily fusible.

Once the connections between the branch pipes and the main pipe have been re-established by cutting through the liner by using the cutting unit, the liner is grouted into position. In order to avoid escape of the grout at the junctions with the branch pipes it is necessary to plug these connections. The Bremner patent referred to above proposes the use of inflatable plugs for this purpose. Bremner's inflatable plug comprises a half-inch diameter steel cable extending between circular end plates formed with short axially extending flanges to which the ends of a cylindrical rubber sleeve are secured by stainless steel bands. The leading end of the plug is formed as a nose for guiding purposes, the nose consisting of a number of guide arms distributed around the central pipe and welded at their ends to the pipe and the respective end plate. The semi-rigid construction of the Bremner plugs again causes difficulties in negotiating sharp bends in narrow pipes.

It is an object of the invention to obviate or mitigate the abovementioned disadvantages.

According to a first aspect of the invention there is provided cutting apparatus for insertion into a branch pipe to cut an aperture in a liner located within a main pipe with which the branch pipe communicates, the apparatus comprising a body, a cutting device supported by the body, a clamping member supported by the body, means for actuating the clamping member so that it presses against the inside of the branch pipe, and means for advancing the cutting device relative to the body.

Preferably the clamping member is an inflatable member positioned on the outer surface of the body. Preferably the body is cylindrical and the inflatable member is a tubular sheath into which the cylindrical body is inserted. The sheath is clamped in position to give a substantially air-tight seal and compressed air is introduced into the space between the cylinder and the sheath to inflate the sheath.

Preferably also the apparatus includes a motor for effecting rotation of the cutting device to perform the cutting operation.

According to a second aspect of the present invention there is provided a method of repairing pipework having a main pipe connected at a junction to a branch pipe, the method comprising the steps of introducing a tubular liner into the main pipe, inserting the cutting apparatus defined above into the branch pipe at an access point remote from the junction moving the cutting apparatus along the branch pipe to the locus of said junction, clamping the cutting apparatus in position, advancing the cutting device relative to the body of the apparatus, and cutting an aperture in the liner.

Preferably this method additionally includes the steps of introducing to the locus of the junction after the liner has been cut an inflatable plug in the form of an elongate bag with a fully flexible outer wall capable of laying flat when the bag is in the deflated condition, the bag having a semi-rigid spine adapted to be connected to a rod for moving the bag into position and supplying fluid under pressure to the bag for inflating it, inflating the bag to provide a seal between the bag on the one hand and the outer end of the branch pipe and the liner opening on the other hand, introducing grout between the main pipe wall and the liner, hardening the grout and deflating the plug. Preferably the plug has a central passageway permitting flow through the plug when in use.

The advantage of using the inflatable plug defined above is that the plug is sufficiently flexible to negotiate sharp bends when being introduced along the pipework into position.

The invention will now be further described by way of example only, with reference to the accompanying drawings, in which:-

Figure 1:
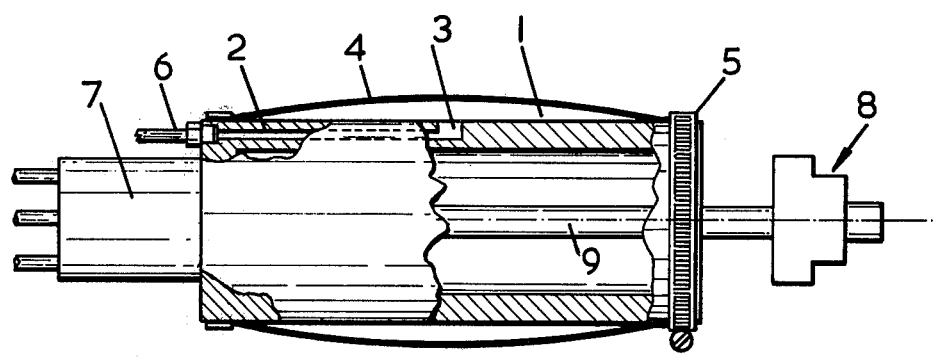
FIG. 1 illustrates a first embodiment of mobile perforating unit according to the invention.

Referring to FIG. 1, the illustrated perforating unit comprises a rigid tubular body 1 through which an air passage 2 extends to a radial opening 3. An inflatable sheath-like tubular bag 4 is clamped at its ends by clips 5. The bag 4 can be inflated by supplying compressed air to the passage 2 via a line 6, the compressed air entering the enclosed space between the bag 4 and the cylindrical surface of the body 1 via opening 3.

A hydraulic motor 7 is rigidly supported on one end of the tubular body and a cutting head 8 is supported on the other end. The hydraulic motor is connected by means not shown to a shaft 9 supporting the cutting head such that the motor can simultaneously rotate the head 8 and advance the shaft 9 out of the body 1.

In use, the perforating unit is inserted into a branch pipe with the cutting head 8 retracted and propelled by any suitable means, e.g. by rodding, into contact with the liner to be cut. The bag 4 is inflated to lock the body in position and the cutting head 8 is rotated and advanced to cut the liner. After completion of the cutting operation the cutting head 8 is withdrawn and the bag is deflated. The perforating unit is then withdrawn.

Figure 2:
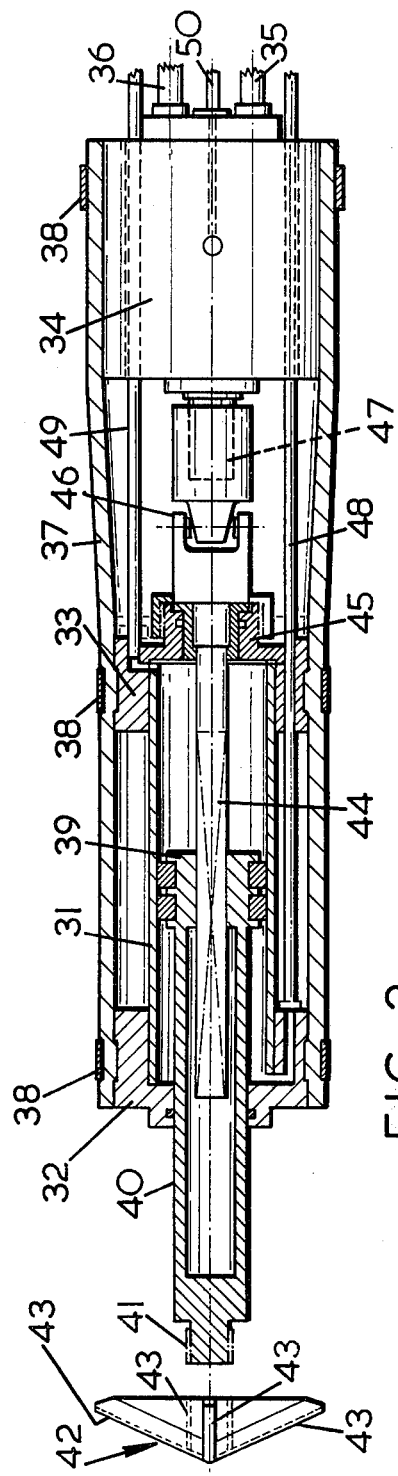
FIG. 2 is a longitudinal section of a second embodiment of mobile perforating unit according to the invention.

The embodiment of perforating unit shown in FIG. 2 comprises a cylinder 31 extending between front and rear walls 32, 33. Behind the cylinder 31 is a hydraulic motor 34 with input and output connections 35, 36 for hydraulic fluid. A sheath 37 of resilient material envelopes the unit and is held in position by clips 38. Slidably mounted within the cylinder 31 is a piston 39 integral with a hollow shaft 40 which projects through an opening in the front wall 32 to end in a screwthreaded spigot 41.

A cutting head 42 has a tapped socket 43 which fits onto the spigot 41. The cutting head 42 is of cruciform shape as seen from the left in FIG. 2 and each of its four arms carries a replaceable cutting blade 43 the depth of penetration of which is indicated by dotted line. The outer end of each blade also has a rearwardly directed cutting portion for the purpose described below.

An intermediate shaft 44 is slidably but non-rotably engaged in the piston 39, e.g. by means of splines or, as shown, by cooperating flats on the shaft 44 and the bore in the piston 39. The shaft 44 is journalled in a bearing 45 of the end wall 33 and is connected at its rear end to one half of a universal coupling 46 the other half of which is fixed to the output shaft 47 of the hydraulic motor 34.

Flexible hydraulic pipes 48, 49 lead to front and rear compartments respectively of the cylinder 31. When one of these pipes delivers hydraulic fluid under pressure to the respective cylinder compartment the other pipe drains fluid from its compartment.

The perforating unit of FIG. 2 operates in a similar fashion to that illustrated in FIG. 1. The output shaft 47 of the hydraulic motor 34 imparts a rotary motion to the cutting head 42 by means of the universal coupling 46, intermediate shaft 44 and hollow shaft 40. When the perforating unit is jammed in position by inflating the sheath 37 (using an air pipe 50) the rotating cutting head 42 can be advanced by pressurizing the rear cylinder compartment by means of the pipe 49. The cutting head 42 is retracted by pressurizing the front cylinder compartment by means of the pipe 48. Retraction of the cutting head 42 is facilitated by the rearwardly directed cutting portions of the cutting blades 43 enabling the blades to cut their way out of the liner after penetration of the cutting head 42 in to the liner.

Figure 3:
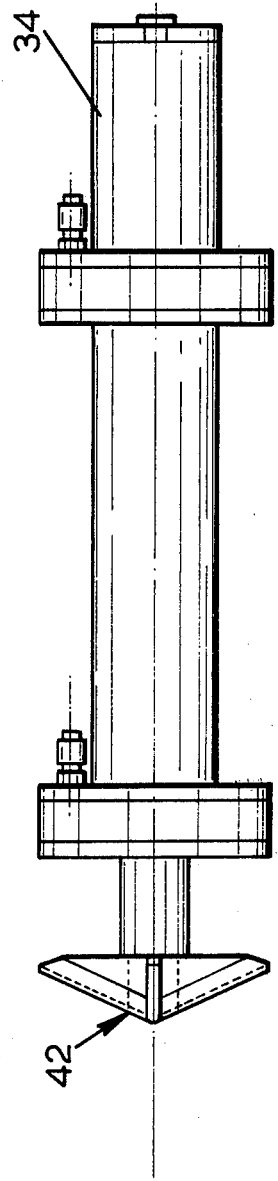
FIG. 3 is a side elevation of a third embodiment of perforating unit according to the invention.

The embodiment of FIG. 3 is substantially the same as that of FIG. 2 but in this case the overall length of the unit is less and it is not necessary to couple the motor to the cylinder so as to facilitate negotiation of bends in the branch pipe. Accordingly the motor 34 is integral with the remainder of the body.

The embodiments of FIGS. 2 and 3 may be moved into position by any convenient means, e.g. rods.

It will be appreciated from the above description that an important factor in the negotiation of bends is the overall length of the perforating unit or, more precisely, the rigid length of the unit. Thus it is possible, as in the embodiment of FIG. 2, to construct the perforating unit as two articulated sections thereby reducing the rigid length of the unit. Another important factor in the negotiation of bends in the branch pipe is the provision in the perforating unit of a motor for the cutting head. One of the reasons why it has previously been impracticable to pass a boring tool along a very tortuous branch pipe is that power is transmitted to the tool by means of a rotary pushrod which fouls the bends in the pipe.

Certain of the features of the designs described above also facilitate the cutting operation when the perforating unit is in position. Thus, jamming of the unit in the pipe reduces or prevents vibration of the unit. The facility for advancing the cutting head into engagement with and through the plastics liner makes it easier to cut the liner on the slant, i.e. at an angle other than a right angle as a result of the branch pipe meeting the main pipe at an oblique angle. Another feature of importance in this context is the conical configuration of the cutting head whereby the liner is cut or shredded radially outwardly from a central point.

Figure 4:
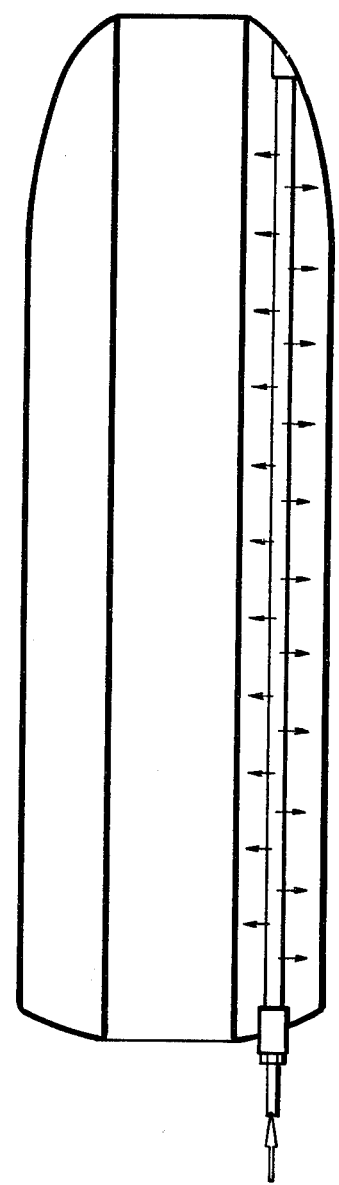
FIG. 4 is a preferred embodiment of inflatable plug for use in the method of the invention.

As explained above, once the liner has been perforated at the junctions of the main pipe with the branch pipes, the liner is grouted into position. In order to prevent escape of grout it is necessary to plug the connections with the branch pipes and for this purpose the present invention contemplates an inflatable plug of which a preferred embodiment is shown in FIG. 4. The inflatable plug comprises an elongate air bag having a double skin defining an air chamber of annular cross-section. The outer skin is made of relatively flexible material whereas the inner skin is made of relatively rigid material so as to define a central passageway extending the full length of the air bag. The bag has a hollow flexible spine with perforations along its length. The rear end of the spine is provided with a screw connection for attaching the air bag to a hollow rod for pushing the bag into position and passing compressed air into the bag through the hollow spine.

The plug is positioned when the air bag is fully deflated so as to lie completely flat. The plug is rodded along the branch pipe and through the opening in the liner until the front end of the spine contacts the opposite wall of the liner. The air bag is then retracted a predetermined distance to position the bag accurately in the opening. Compressed air from a compressor on the surface is then passed along the rod and into the air bag via the spine. When the bag is fully inflated a tight seal is formed between the outer skin of the bag on the one hand and the outer end of the branch pipe and the liner opening on the other hand. Grout introduced under pressure between the main sewer wall and the liner is therefore unable to escape either into the branch pipe or into the interior of the liner. When the grout has set the air bag is simply deflated and the plug removed. It will be appreciated that it may be many hours before the plug can be removed and it is an important feature of the present design that the central passageway permits continued flow of fluid from the branch pipe into the main pipe while the plug is in position. Although this feature is important it is not essential and it is within the scope of the invention to provide an inflatable plug not having such a passageway and which therefore obstructs flow of fluid between the branch pipe and the main pipe when the plug is in position. In this modification the bag may comprise a single skin but as with the previous embodiment this will be fully flexible so that the bag lies flat when deflated. The absence of any rigid components in the outer wall of the plug facilitates the negotiation of bends in narrow pipes.

In a further modification of the embodiment of FIG. 4 the flexible spine extends within the central passageway rather than between the inner and outer skins.

What is claimed is:-

1. A cutting apparatus for insertion into a branch pipe to cut an aperture in a liner located within a main pipe with which the branch pipe communicates, the apparatus comprising:

a body;

a cutting device supported by the body;

rotating means for rotating said cutting device, said rotating means being mounted with said body thereby preventing relative axial motion between said rotating means and said body;

a clamping member mounted with said body, said clamping member substantially surrounding said body and extending over the substantial length of said body;

means for actuating said clamping member so that it presses against the inside of the branch pipe in order to hold said body and said rotating means locked with respect to such branch pipe;

means for advancing said cutting device relative to said body; and said rotating means including a motor which is articulated to said body.

2. The apparatus as claimed in claim 1 wherein:

said clamping member is an inflatable member positioned on the outer surface of the body.

3. The apparatus of claim 2, wherein:

said body comprises a front wall; and
said inflatable member extends from said front wall to said rotating means.

4. The apparatus of claim 2, wherein:

said body comprises a front wall; and
said inflatable member extends from said front wall to cover said rotating means.

5. The apparatus as claimed in claim 1, wherein:

the cutting device is mounted on a first shaft;

said first shaft having a piston formed at one end, said piston being slidably mounted within said body;

said first shaft formed having a drive opening extending through said piston; and said means for advancing the cutting device include fluid pressure, said fluid pressure forcing said piston to move within said body thereby selectively extending or retracting said cutting device.

6. The apparatus as claimed in claim 5, wherein:

the motor drives a second shaft, said piston being slidably mounted with said second shaft, and said second shaft extending through said piston and into said drive opening of said first shaft, whereby rotation of said motor causes rotation of said cutting device.

* * * * *